(12) United States Patent
Wang et al.

(10) Patent No.: US 8,179,909 B2
(45) Date of Patent: May 15, 2012

(54) METHOD AND SYSTEM FOR HARMONIZING QOS IN HOME NETWORKS

(75) Inventors: Yige Wang, Natick, MA (US); Kohtaro Asai, Yokohama (JP); Shin Miura, Kanagawa (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 267 days.

(21) Appl. No.: 12/637,956

(22) Filed: Dec. 15, 2009

(65) Prior Publication Data

US 2011/0142061 A1 Jun. 16, 2011

(51) Int. Cl.
*H04L 12/28* (2006.01)

(52) U.S. Cl. ......... 370/401; 370/352; 370/392; 370/468

(58) Field of Classification Search ..................... None
See application file for complete search history.

(56) References Cited

U.S. PATENT DOCUMENTS

| | | | |
|---|---|---|---|
| 6,798,750 B1* | 9/2004 | Langgartner | 370/252 |
| 6,865,153 B1* | 3/2005 | Hill et al. | 370/230.1 |
| 2003/0095551 A1* | 5/2003 | Gotoh et al. | 370/395.3 |
| 2007/0223430 A1* | 9/2007 | Desai et al. | 370/338 |

* cited by examiner

*Primary Examiner* — Duc C Ho (74) *Attorney, Agent, or Firm* — Dirk Brinkman; Gene Vinokur (57) ABSTRACT

Packet in a multimedia stream has and associated standard priority level specified by standard protocols. The standard priority level in input packets received by a home gateway is converted to a harmonized priority level. Then, the input packets are processed in the home gateway according to the harmonized priority level, and converted from the harmonized priority level to the standard priority level in corresponding output packets after the processing.

28 Claims, 11 Drawing Sheets

| Protocol | DSCP | Harmonized DSCP of Unified Protocol |
|---|---|---|
| DLNA | 0x38 | 0x22 |
| DLNA | 0x28 | 0x1A |
| DLNA | BE (0x00) | BE (0x16) |
| DLNA | 0x08 | 0x0E |
| DVB-IP | 0x2E | 0x1A |
| DVB-IP | 0x22 | 0x1C |
| DVB-IP | 0x24 | 0x1E |
| DVB-IP | 0x1A | 0x12 |
| DVB-IP | BE (0x00) | BE (0x16) |
| HGI | 0x38 | 0x22 |
| HGI | 0x30 | 0x24 |
| HGI | 0x28 | 0x1A |
| HGI | 0x20 | 0x1E |
| HGI | 0x18 | 0x12 |
| HGI | BE (0x00) | BE (0x16) |
| HGI | 0x10 | 0x0A |
| HGI | 0x08 | 0x0E |

*FIG. 5*
500

| DSCP | 802.11 | 802.1D |
|---|---|---|
| 0x38 | AC_VO | 7 |
| 0x30 | AC_VO | 6 |
| 0x28 | AC_VI | 5 |
| 0x20 | AC_VI | 4 |
| 0x18 | AC_BE | 3 |
| BE (0x00) | AC_BE | 0 |
| 0x10 | AC_BK | 2 |
| 0x08 | AC_BK | 1 |

*FIG. 6*
600

| Des. IP Address | Des. Port No. | Protocol ID |
|---|---|---|
| 201.133.25.10 | 99 | DLNA |
| 201.133.25.12 | 10 | DVB-IP |
| 201.133.25.16 | 25 | DLNA |
| 201.133.25.11 | 5 | HGI |
| 201.133.25.18 | 20 | DVB-IP |

METHOD AND SYSTEM FOR HARMONIZING QOS IN HOME NETWORKS

FIELD OF THE INVENTION

This invention relates generally to quality-of-service (QoS) for communication protocols, and more particularly to harmonizing the QoS for different Internet Protocol standards in home networks.

BACKGROUND OF THE INVENTION

Home Networks

Multimedia devices are common in residential settings. These devices include PCs, TVs, printers, recorders and audio playback devices, and the like. Conventionally, these devices operate independently, using different application programs. Typically, the devices do not share multimedia, access to the Internet and service providers. Emerging home networking technologies enable the devices to communicate with one another and be connected to an access network via a home gateway. When the access network is connected to service providers, multimedia contents, in the form of packets, can be streamed to the devices via Internet.

Packets

Figure 1A:
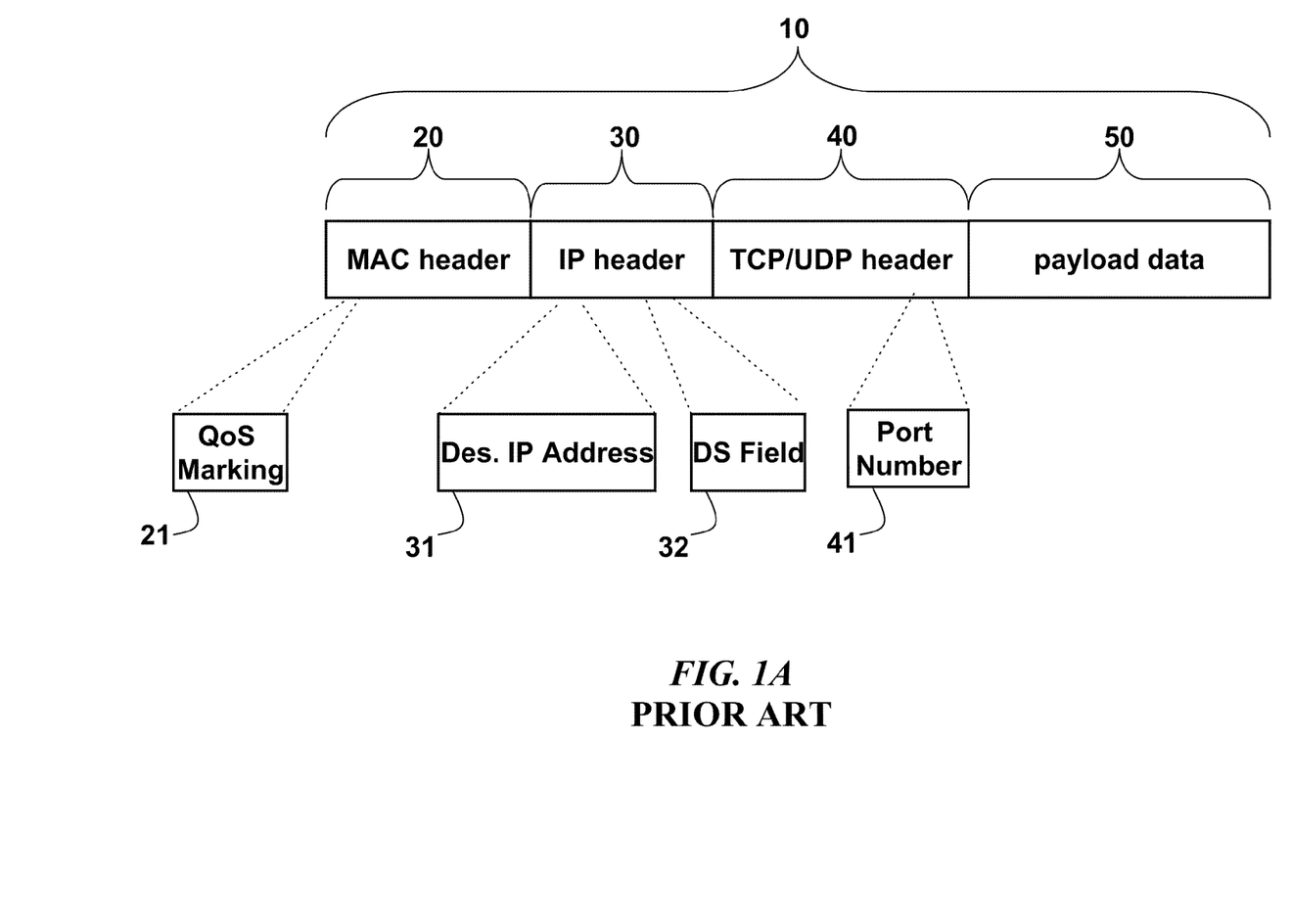
FIG. 1A is a block diagram of a conventional Internet packet.

FIG. 1A shows a conventional Internet packet 10. The Internet can use a transport layer protocol (TCP) or a user datagram protocol (UDP). If UDP is used, the service is unreliable because the source is not notified when a delivery fails. The packets, in the context of TCP/IP, are generally called datagrams.

The packet includes a media access (MAC) header 20, an IP header 30, TCP/UDP header 40, and payload data 50. Fields of interest to the invention are the QoS marking 21 in the MAC header, the destination IP address 31 and the differentiated services (DS) field 32 in the IP header, and the port number 41 in the TCP/UDP header.

DS Field

Differentiated Services (DiffServ) are defined in the Internet Engineering Task Force (IETF) Request for Comment (RFC) 2474. The DS field is included in the IP header. DiffServ, in part, specifies quality-of-service (QoS). As shown in Table 1, the DS field includes of eight bits.

TABLE 1

| | | | DS Field | | | | |
|---|---|---|---|---|---|---|---|
| DS5 | DS4 | DS3 | DS2 | DS1 | DS0 | ECN | ECN |

The six most significant bits are called the differentiated services code point (DSCP). With six bits available, a total of 64 DSCP are available, thus allowing 64 standard Internet service protocol distinctions, or priority levels.

Currently, only a subset of all possible values in the field is used by the DiffServ routers. DSCP. The two least significant bits are used for Explicit Congestion Notification (ECN).

DiffServ-enabled routers and other network elements use the DSCP to differentiate the network traffic, i.e., classifying packets as the packets enter the local network. DiffServ uses the Behavior Aggregate (BA) classification method. In the BA classification method, packets are classified based only on the DSCP values. Packets from different sources having the same DSCP value are grouped as a BA and treated in the same manner. A per-hop behavior (PHB) is a description of the externally observable forwarding behavior of a DS node applied to a particular BA.

The DiffServ standard utilizes three most significant bits in the DS field, i.e., DS5, DS4 and DS3, for priority setting. The other three bits in the DSCP provide a finer priority granularity.

In practice, most networks use the following commonly-defined PHBs: Default PHB, which is typically best-effort traffic; Expedited Forwarding (EF) PHB, which is dedicated to low-loss, low-latency traffic; Assured Forwarding (AF) PHB, gives assurance of delivery under conditions; Class Selector (CS) PHBs, which are defined to maintain backward compatibility with the IP Precedence field.

The Class Selector codepoints are of the form 'xxx000'. The first three bits are the IP precedence bits. Each IP precedence value can be converted into a DiffServ class. If a packet is received from a non-DiffServ aware router that used IP precedence markings, then the DiffServ router can still determine the encoding as a Class Selector codepoint.

The Request For Comment (RFC) 2597 defines the Assured Forwarding (AF) PHB as a means for a provider DS domain to offer different levels of forwarding assurances for IP packets received from a customer DS domain. Assured forwarding provides assurance of delivery as long as the traffic does not exceed some subscribed rate. Traffic that exceeds the subscription rate faces a higher probability of being dropped if congestion occurs.

The AF PHB guarantees a certain amount of bandwidth to an AF class and allows access to extra bandwidth, if available. There are four AF classes, AF1x through AF4x.

Within each class, there are three service levels based on drop probabilities. Traffic that exceeds the assigned subscription rate faces a higher probability of being dropped when congestion occurs. The following Table illustrates the DSCP coding for specifying the AF class with the probability. Bits DS5, DS4 and DS3 define the class; bits DS2 and DS1 specify the drop probability; bit DS0 is always zero. Table 2 shows the DSCP values for assured forwarding PHB.

TABLE 2

DSCP values for assured forwarding PHB

| Drop | Class 1 | Class 2 | Class 3 | Class 4 |
|---|---|---|---|---|
| Low | 001010 | 010010 | 011010 | 100010 |
| | AF11 | AF21 | AF31 | AF41 |
| | DSCP 10 | DSCP 18 | DSCP 26 | DSCP 34 |
| Medium | 001100 | 010100 | 011100 | 100100 |
| | AF12 | AF 22 | AF32 | AF42 |
| | DSCP 12 | DSCP 20 | DSCP 28 | DSCP 36 |
| High | 001110 | 010110 | 011110 | 100110 |
| | AF13 | AF23 | AF33 | AF43 |
| | DSCP 14 | DSCP 22 | DSCP 30 | DSCP 38 |

Table 3 gives the values of DSCP in binary, decimal and hexadecimal.

TABLE 3

DSCP values in different representations

| DSCP | Binary | Decimal | Hexadecimal |
|---|---|---|---|
| Default | 000000 | 0 | 0x00 |
| CS1 | 001000 | 8 | 0x08 |
| AF11 | 001010 | 10 | 0x0A |
| AF12 | 001100 | 12 | 0x0C |
| AF13 | 001110 | 14 | 0x0E |
| CS2 | 010000 | 16 | 0x10 |
| AF21 | 010010 | 18 | 0x12 |
| AF22 | 010100 | 20 | 0x14 |
| AF23 | 010110 | 22 | 0x16 |

TABLE 3-continued

DSCP values in different representations

| DSCP | Binary | Decimal | Hexadecimal |
|---|---|---|---|
| CS3 | 011000 | 24 | 0x18 |
| AF31 | 011010 | 26 | 0x1A |
| AF32 | 011100 | 28 | 0x1C |
| AF33 | 011110 | 30 | 0x1E |
| CS4 | 100000 | 32 | 0x20 |
| AF41 | 100010 | 34 | 0x22 |
| AF42 | 100100 | 36 | 0x24 |
| AF43 | 100110 | 38 | 0x26 |
| CS5 | 101000 | 40 | 0x28 |
| EF | 101110 | 46 | 0x2E |
| CS6 | 110000 | 48 | 0x30 |
| CS7 | 111000 | 56 | 0x38 |

QoS in Home Networks

One method for providing QoS is class-based. In class-based QoS, the packets are aggregated into a small number of classes, typically 4-8. The class-based QoS has a relatively low complexity because explicit resource management is not required, and offers scalability because devices do not need to maintain sessions. Although class-based QoS uses priorities, a particular QoS is not guarantees.

A number of different technologies and standard Internet service protocols are known to provide class-based QoS in home networks: [DSL-F TR133] DSL Forum (Note1) TR-133 (2005); DSLHome TR-064 Extensions for Service Differentiation; [DLNA] IEC 62481-1 (2006); and DLNA Home networked device interoperability guidelines Part 1: Architecture and Protocols; [DVB-IP] ETSI TS 102 034 (2007); Digital Video Broadcasting (DVB); Transport of MPEG-2 TS Based DVB Services over IP Based Networks; [HGI] Home Gateway Initiative (2006); Home Gateway Technical Requirements: Release 1.0; and [UPnP] UPnP QoS (2006), UPnP QoS Architecture: 2.

Although all of these protocols adopt class-based QoS methods, there still are inconsistencies. For example, different protocols have a different number of priority levels, and the same DS can represent different priority levels in different protocols.

Table 4 summarizes some of these inconsistencies. The priorities for three commonly used protocols are listed in the columns. The DSCP values with the same priority are in the same column. Note that the relative priorities given to different priority levels in these protocols just represent an example case. The second highest priority (0x28) in DLNA, for example, is at the same overall level as the highest priority (0x2E) in DVB-IP and the third highest priority (0x28) in HGI. A different scaling can be used in actual deployments.

TABLE 4

DSCP comparison of three protocols

| | Lower than BE | BE | | | | Higher than BE | | |
|---|---|---|---|---|---|---|---|---|
| DLNA | 0x08 | 0x00 | | | | 0x28 | | 0x38 |
| DVB-IP | | 0x00 | 0x1A | 0x24 | 0x22 | 0x2E | | |
| HGI | 0x08 0x10 | 0x00 | 0x18 | 0x20 | | 0x28 | 0x30 | 0x38 |

Priority can be generally categorized as: best effort (BE), lower than BE, and higher than BE. As shown in Table 4, different protocols have a different number of classes and each protocol has different coding for its priorities. For example, 0x1A in DVB-IP and 0x18 in HGI represent the same priority level.

The home gateway can allocate resources according to the harmonized priority levels, wherein the resources include bandwidth, scheduling, buffers, a number of retransmission attempts, and packet drop probabilities. However, the inconsistencies of Table 4 can lead to confusion about the priority and resource allocation, and thereby reduce the efficiency of the QoS method.

In summary, the priorities need to be harmonized and determined consistently when streams using different protocols arrive at the home gateway. To achieve harmonization, it is practically impossible to modify the protocols specified by various standards. Therefore, there is a need for a method that can harmonize priorities without modifying existing protocols.

SUMMARY OF THE INVENTION

The embodiments of the invention harmonize QoS for home networks including multimedia devices where a home gateway connects the devices to an access network. The harmonization is performed in two harmonization layers of a protocol stack implemented in the home gateway. An upper harmonization layer is between the application layer and a transport layer. A lower harmonization layer is between the IP layer and data link layer. The harmonization is transparent to the access network and the devices. The harmonization converts between standard priority levels and harmonized priority levels using a mapping Table.

DETAILED DESCRIPTION OF THE PREFERRED EMBODIMENT

Figure 1B:
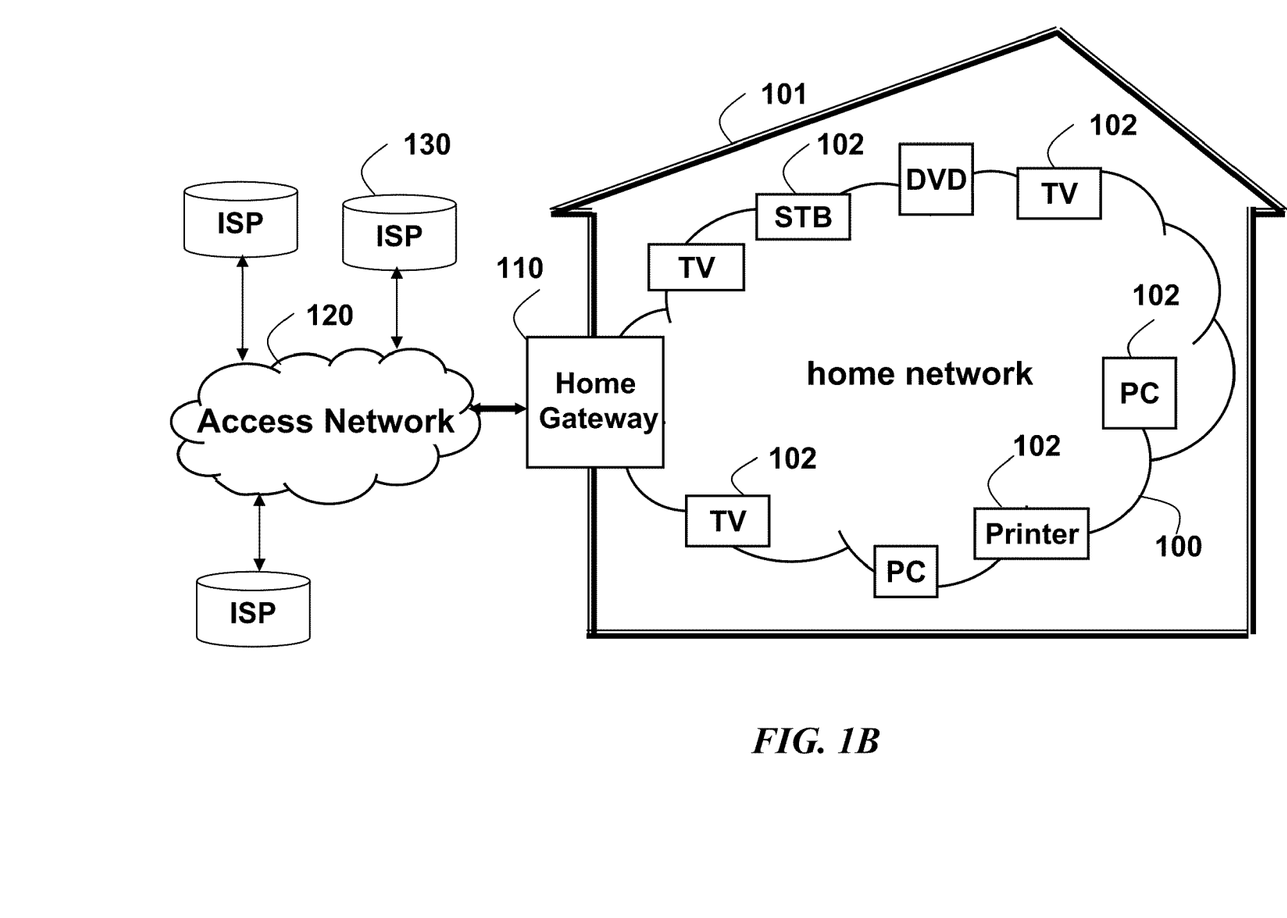
FIG. 1B is a block diagram of a home network used by embodiments of the invention.

FIG. 1B shows a home network 100 that uses embodiments of our invention. The network operates in a residence 101. The residence includes a home gateway 110 and multimedia devices 102 such as TVs, PCs, printers, set-top boxes (STB), and the like. The home gateway 110 connects the devices to each other and to an access network 120. Thus, the home network is an extension of the access network. Multimedia streams with different protocols are streamed from sources to destinations by the home gateway. The sources can be Internet service providers (ISP) 130 and the devices 102. The ISPs are defined broadly as any data source or sink that complies with the suite of Internet standards. The standardized Internet Protocol Suite (TCP/IP) serves billions of users and devices worldwide.

The destinations can also be the ISP and the devices. The ISP transfers data streams to the device, the devices can send back commands or data. Similarly, the devices can send commands and data streams to each other. Generally, the home gateway neither a source nor a destination.

Figure 2:
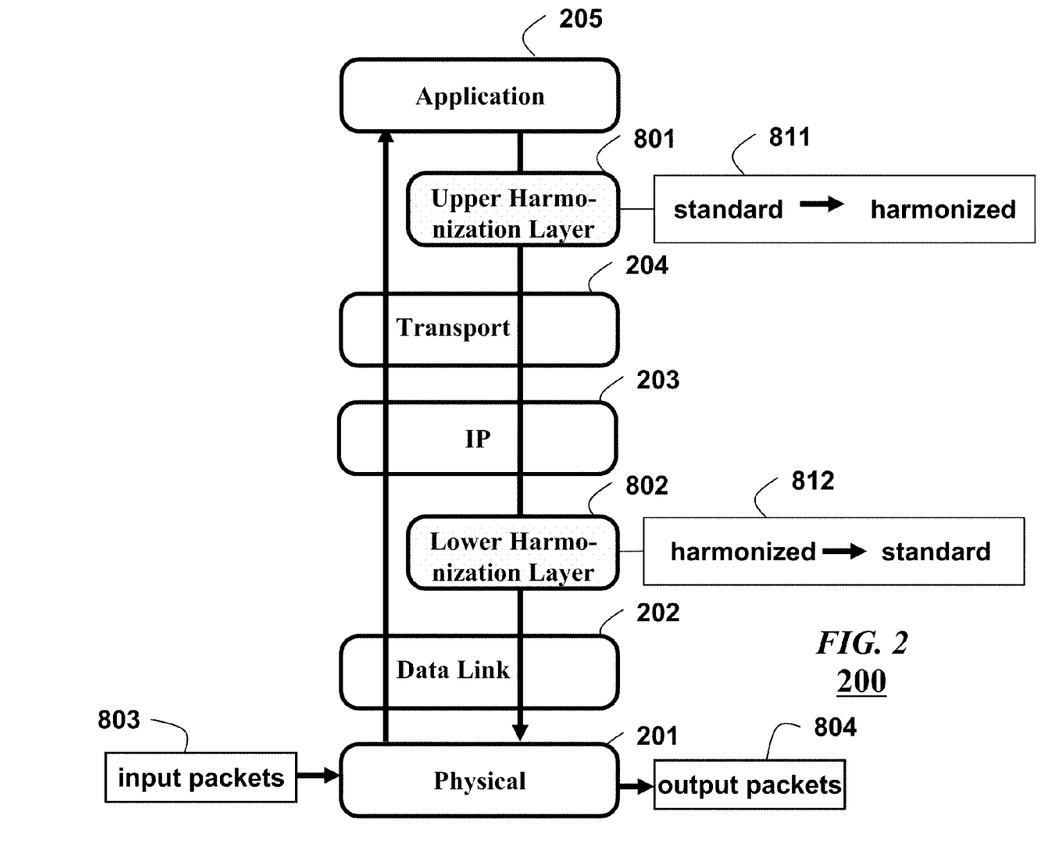
FIG. 2 is a block diagram of a protocol stack including harmonization layers according to embodiments of the invention.

FIG. 2 shows the layers of a protocol stack 200 according to embodiments of our invention. For the purpose of this invention, we are mainly concerned when the home gateway is routing input packets 803 from the sources to destinations as output packets 804.

The stack includes the following layers: physical 201, data link 202, IP 203, transport 204, and application 205. It is understood that the protocol stack can include other layers or variations of the layers, depending on the specific protocol.

The stack also includes an upper harmonization layer 801, and lower harmonization layer 802. The upper harmonization layer is between the application layer and the transport layer. The lower harmonization layer 802 is between the IP layer and the data link layer. As shown in FIG. 2, the conversions 811-812 are performed as the packet is passed from the application to the physical layer.

Unlike conventional layers, the harmonization layers do not append (or delete) a header to (or from) the datagrams. Instead, the layers modify the IP header to implement the harmonization according to embodiments of the invention. The modification converts a priority from a standard Internet service protocol to a harmonized protocol. As stated above, the modification is transparent to the source and the destination devices.

Because different protocols have different QoS policies, the harmonization facilitates correct resource assignments to every stream according to its harmonized priority level. The harmonized priority level is applicable for all standard priority levels of all conventional Internet protocols.

Figure 3:
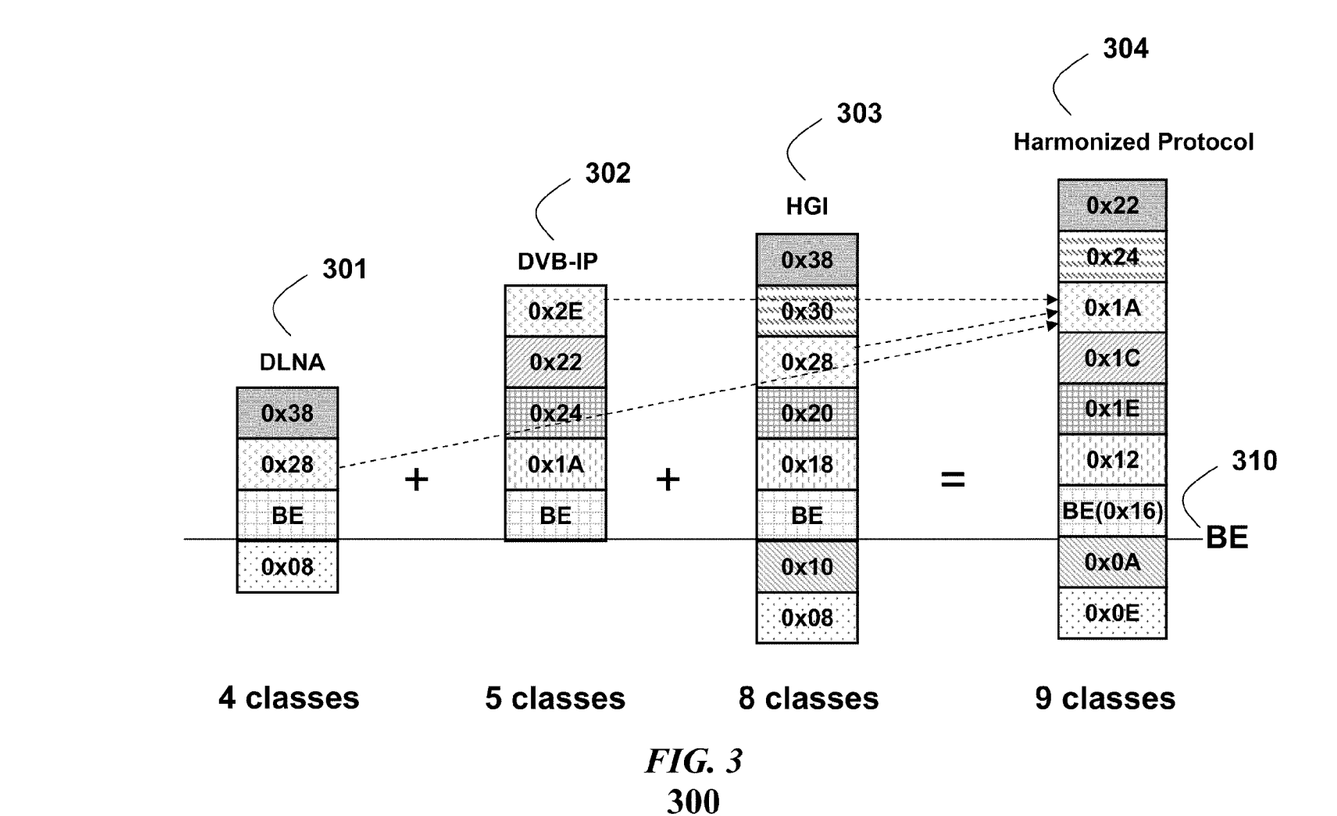
FIG. 3 is a schematic of harmonizing protocols according to embodiments of the invention.

FIG. 3 shows how to harmonize different protocols for three example conventional standard protocols DLNA 301, DVB-IP 302, and HGI 303. As shown in FIG. 3, for each protocol, the top class has the highest priority and the bottom class has the lowest priority. DLNA has three classes above best effort (BE) and one below BE. DVB-IP has only four classes above BE 310, HGI has five classes above BE and two below BE. Users or network administrators can select the priority relativity of different protocols. In FIG. 3, we follow the example priority scaling of Table 4 to determine the relative priority. In FIG. 3, the same hatching represents the same priority. Some classes of these three protocols have the same priority. For example, 0x2E in DVB-IP, 0x28 in HGI and DLNA have the same priority. After merging different classes, a nine-class harmonized protocol 304 is obtained. The classes of different protocols that have the same priority are converted to the same class in the harmonized protocol 304. For example, 0x2E in DVB-IP, 0x28 in HGI and DLNA are converted to 0x1A in the harmonized protocol. Because two classes in the harmonized protocol are below BE, an appropriate DSCP value for the BE class is selected so that the DiffServ can determine the relative priority. In FIG. 3, we select 0x16 for BE.

Figure 4:
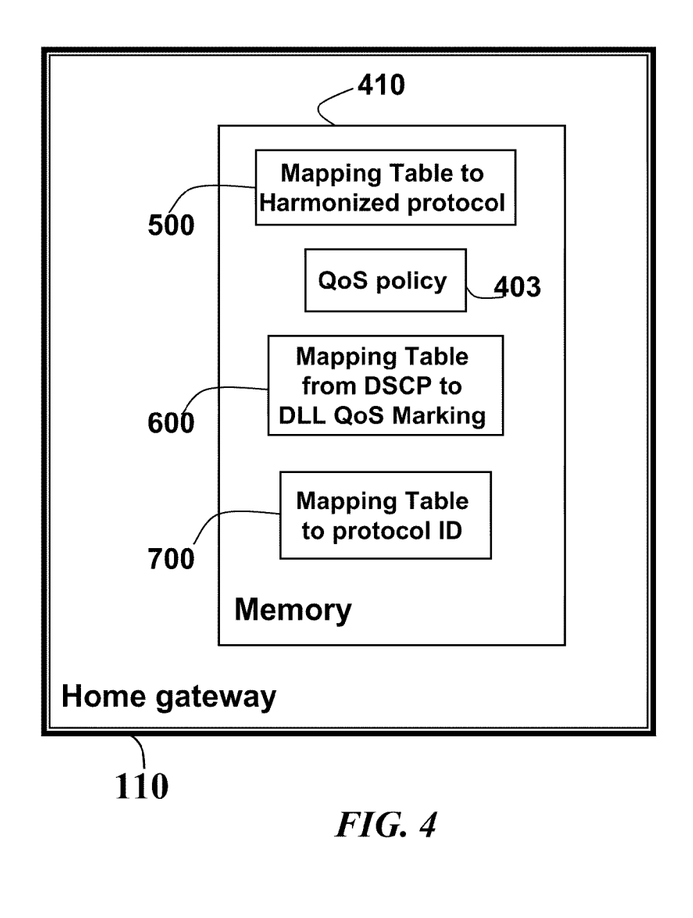
FIG. 4 is a block diagram of the memory in the home gateway according to embodiments of the invention.

For harmonization, some a priori information is stored in the memory 410 of the home gateway as shown in FIG. 4. This information includes a harmonization mapping Table 500 that converts the DSCP value of any protocol to that of the harmonized protocol. Because some devices in home network cannot interpret the DSCP values in the IP header, the devices need to use the layer-2 QoS marking in the MAC header 21. Therefore, for each protocol, a DSCP mapping Table 600, which converts the DSCP value to QoS marking of DLL, is also included. An ID mapping Table 700 converts the destination IP address and port number to a corresponding protocol identification (IS). The memory also stores a QoS policy 403.

Figure 5:
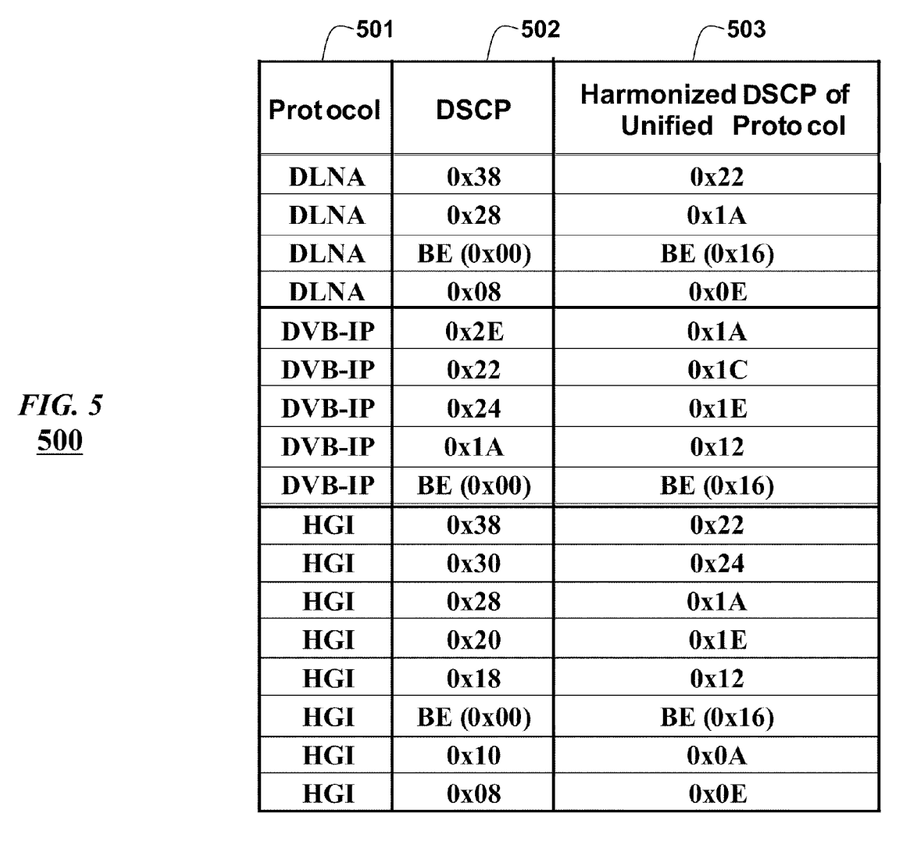
FIG. 5 is a harmonization mapping Table maintained by the home gateway according to embodiments of the invention.

FIG. 5 shows an example of a mapping Table 500. The columns in the Table 500 are protocol name 501, DSCP value 502, DSCP of harmonized protocol 503. In practice, the mapping Table has entries for all different protocols that need to be harmonized.

Figure 6:
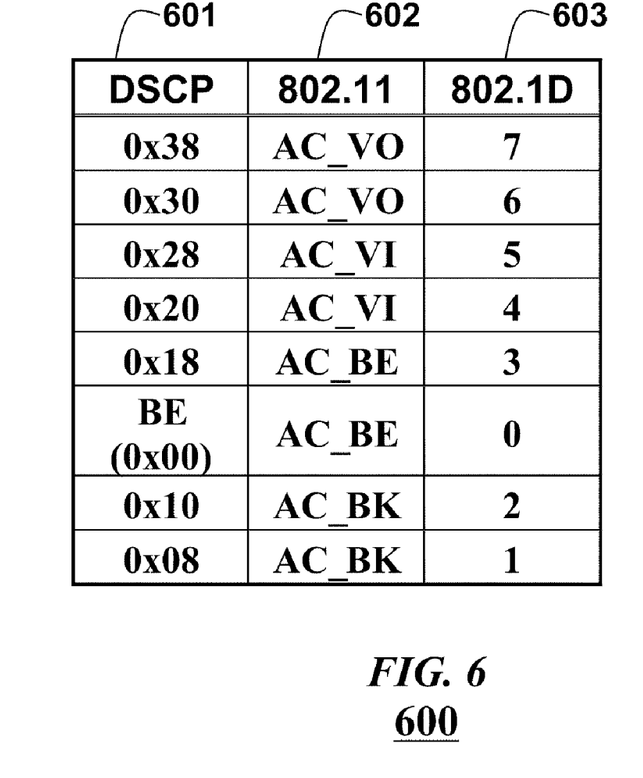
FIG. 6 is a mapping Table from DSCP values to QoS marking of a data link layer according to embodiments of the invention.

FIG. 6 shows an example of the DSCP mapping Table 600. This Table is for protocol HGI. For HGI, data link layer can adopt standard IEEE 802.11 or 802.1D. In FIG. 6, there are three columns, which are DSCP values 601, QoS marking in 802.11 602, and QoS marking in 802.1D 603. The DSCP value is translated to the corresponding DLL QoS marking based on the DLL protocol and this mapping Table.

Figure 7:
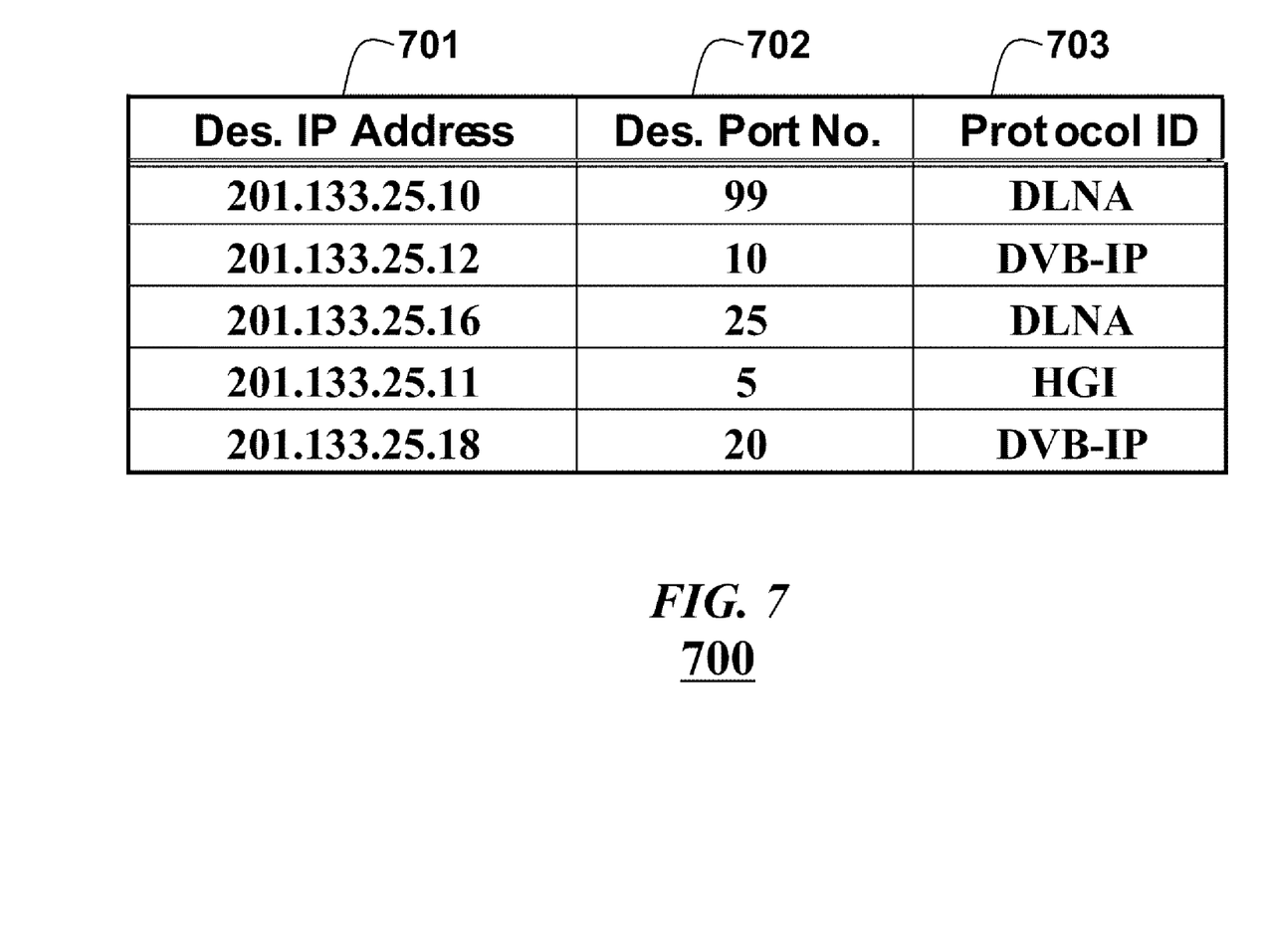
FIG. 7 is a block diagram of QoS harmonization process in the home gateway according to embodiments of the invention.

FIG. 7 shows an example of the ID mapping Table 700. In FIG. 7, there are three columns, which are destination IP address 701, destination port number 702 and protocol 703. For a given stream, when the destination IP address and port number are known, the corresponding protocol is determined from this Table.

Figure 8:
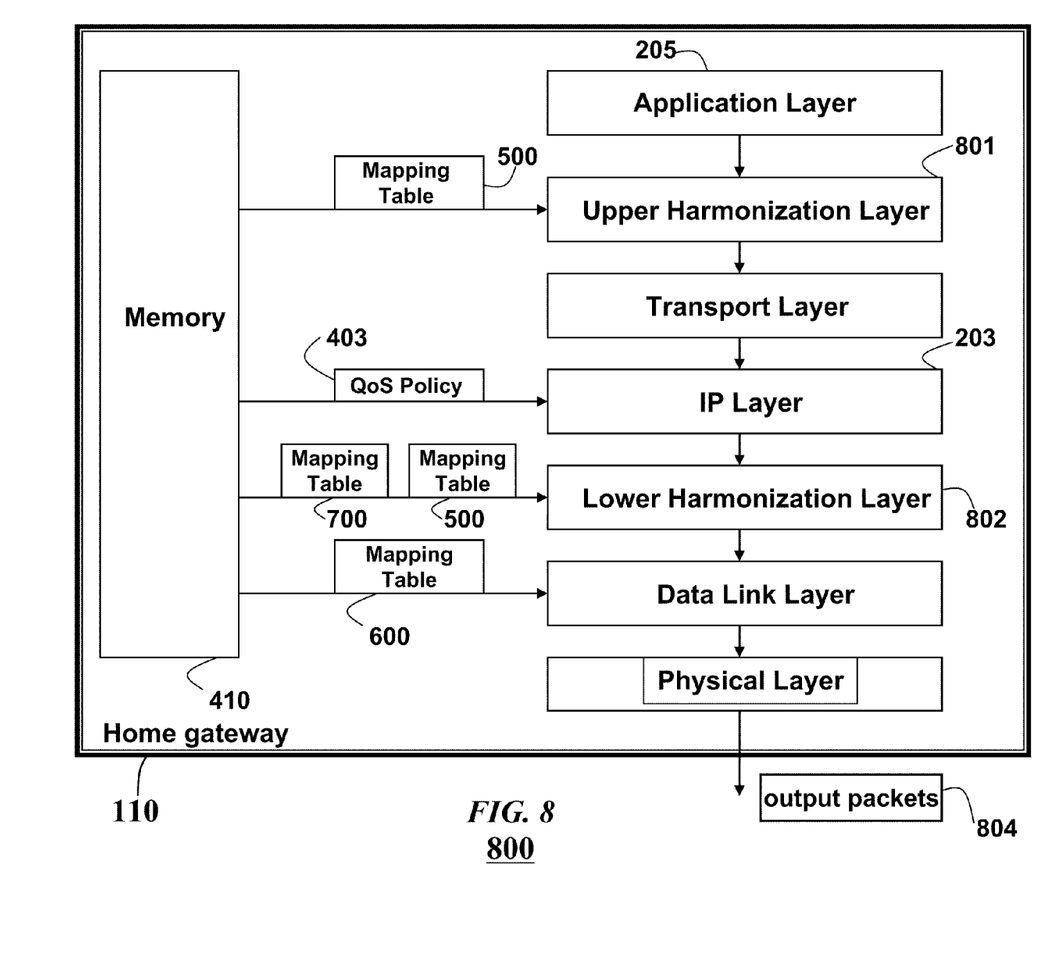
FIG. 8 is a block diagram of the queuing process in the IP layer according to embodiments of the invention.

FIG. 8 shows the harmonization process in the home gateway. The harmonization process is only applied to down stream traffic, i.e., the packets passed from the application layer 205 to the physical layer 201. For a packet, the application layer 205 generates the DSCP value 502, based on, for example, the type of subscription, service, and protocol. The application layer passes the DSCP value and service protocol ID along with other pertinent information, such as destination IP address and port number, etc., to the upper harmonization layer 801. The upper harmonization layer 801 uses the harmonization mapping Table 500 to generate a harmonized DSCP value 503. The DSCP value is replaced by the harmonized DSCP value. The IP layer 203 follows the DiffServ QoS policy 403 to realize QoS requirement according to the harmonized DSCP value. The details of the IP layer process are described for FIG. 9.

The stream passes to the lower harmonization layer 802, which uses mapping Table 700 to obtain the protocol ID for the stream. Then, based on mapping Table 500, an inverse conversion is performed and the original DSCP value of the stream is recovered. The harmonized DSCP value is replaced with the original value. When the stream arrives at the data link layer, according to the mapping Table 600, the QoS marking of the DLL is obtained and written into the MAC header 20.

Figure 9:
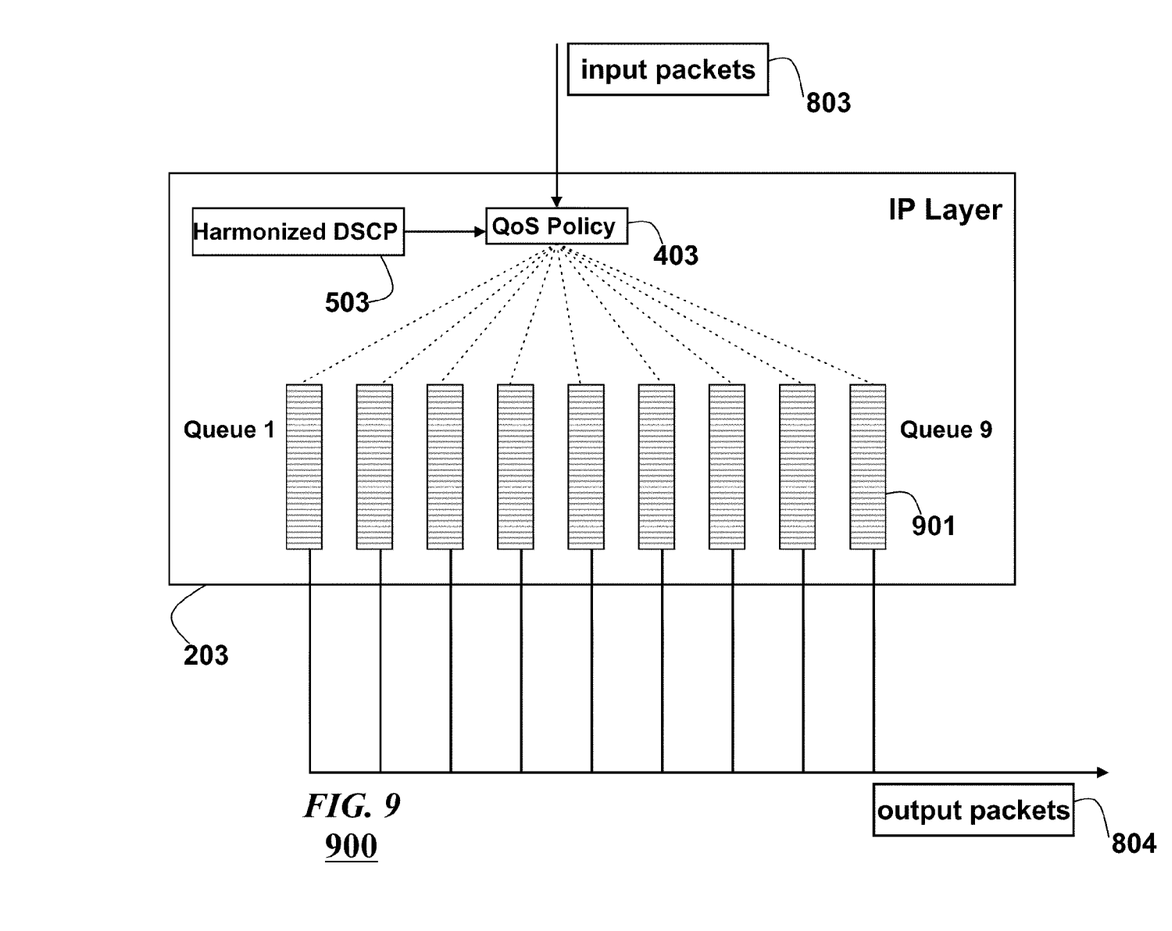
FIG. 9 is a schematic of an IP layer process according to embodiments of the invention.

FIG. 9 shows the queuing process of the IP layer. In our example, the harmonized protocol has nine priority levels or classes. Therefore, there are nine corresponding queues 901. Queue 1 has the highest priority and queue 9 has the lowest priority. When the input packet 803 enters the IP layer 203, the packet is queued according to the QoS policy 403 based on the harmonized DSCP value 503.

Smart Grid

Figure 10:
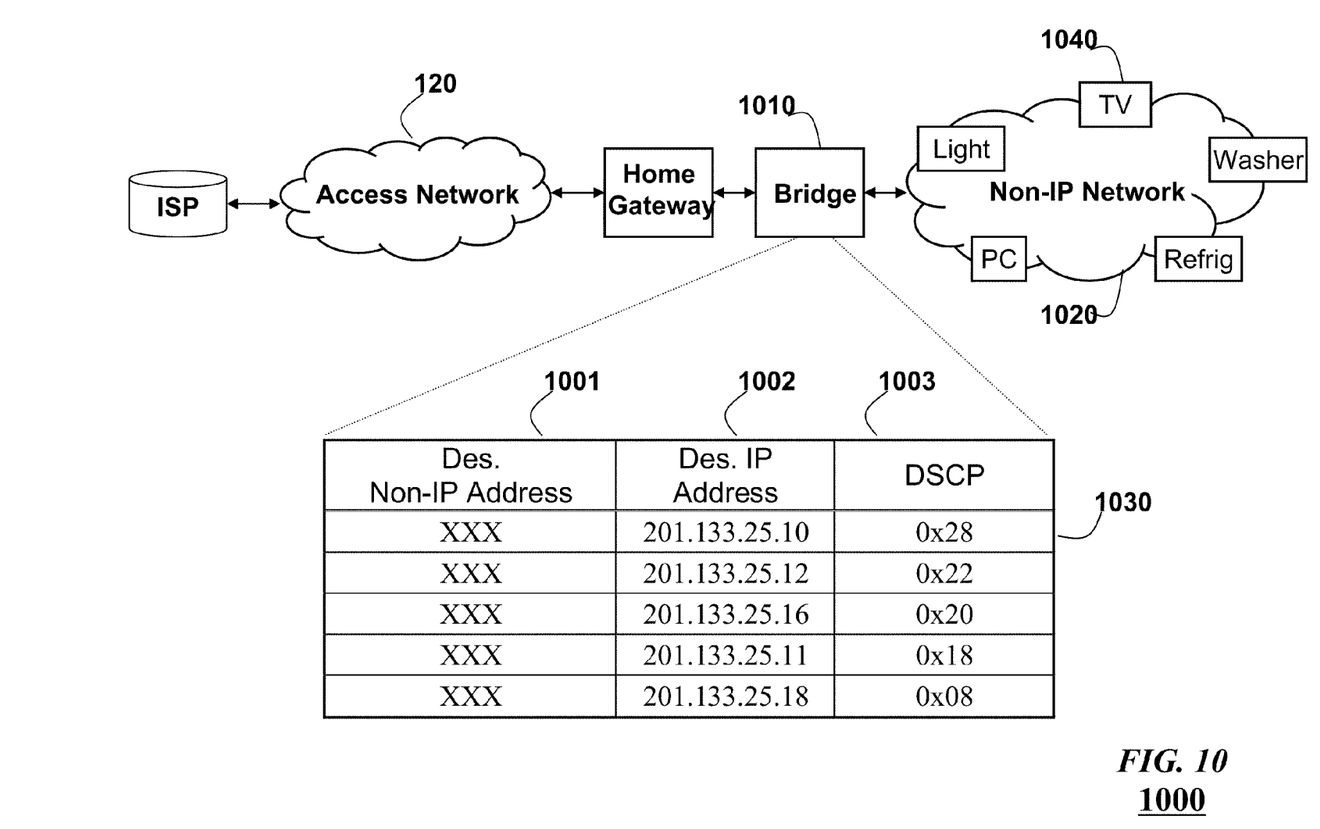
FIG. 10 is a block diagram of home network as a smart grid according to embodiments of the invention.

FIG. 10 shows an embodiment of the invention where the home network is a part of smart grid network 1020 connected to various electrical devices 1040 in a residence, such as appliances, lighting fixtures, HVAC equipment, security alarms, sensors, and the like. It should be noted that the smart grid can coexist with the home network described above.

Smart grid is one type of non-IP networks 1020 that can be used as the home networking technology for smart grid, for example, ZigBee, X10, Z-Wave, etc. In FIG. 10, the non-IP network 1020 is connected with home gateway through a non-IP to Internet Protocol or Ethernet Bridge 1010. The bridge converts a non-IP packet to an IP packet using a mapping table 1030. The destination IP address 1002 and the harmonized DSCP value 1002 can be obtained from the mapping table based on the destination non-IP address 1001. With the harmonized DSCP value, the newly generated IP packets can be treated with an appropriate priority level in the home gateway. It should also be noted that a single physical device can implement both the home gateway and the bridge.

In this embodiment, the priority levels can also be set by a GUI based interface for a user, by running a program, or by allowing default priority level.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for harmonizing packets of a multimedia stream, wherein each packet has an associated input priority level, and wherein the input priority levels of the packets are specified by IEEE protocol standards, comprising the step of:
converting the input priority level of an input packet received by a home gateway to a harmonizes priority level;
processing the input packet in the home gateway according to the harmonized priority level; and
converting, in the home gateway, the harmonized priority level to an output priority level associated with a corresponding output packet after the processing,
wherein the home gateway includes a protocol stack, wherein the protocol stack includes physical, data link (DL), Internet Protocol (IP), transport, and application layers, and wherein the converting to the standard priority level is performed by a lower harmonization layer between the DL and IP layers, and converting to the harmonized priority level is performed by an upper harmonization layer between the transport and application layers.

2. The method of claim 1, wherein the input packet is received in the home gateway from an Internet service provider, and the output packet is transmitted to a device of a home network connected to the home gateway.

3. The method of claim 2, wherein both converting steps are transparent to the Internet service providers and the devices.

4. The method of claim 1, wherein the input packet is received in the home gateway from a device of a home network, and the output packet is transmitted to an Internet service provider.

5. The method of claim 1, wherein the input packet is received in the home gateway from a device of a home network, and the output packets are transmitted to another device of the home network.

6. The method of claim 1, further comprising:
storing temporarily the input packet by the home gateway while processing the input packet.

7. The method of claim 1, wherein the home gateway includes a queue for each harmonized priority level.

8. The method of claim 1, wherein each packet includes an Internet protocol (IP) header, and the IP header includes a differentiated services (DS), and the DS field specifies the standard priority level for the packet.

9. The method of claim 1, wherein the standard priority levels include best effort (BE), lower than BE, and higher than BE.

10. The method of claim 1, further comprising:
allocating resources by the home gateway according to the harmonized priority levels, wherein the resources include bandwidth, scheduling, buffers, a number of retransmission attempts, and packet drop probabilities.

11. The method of claim 1, wherein the devices are selected from a group including televisions, personal computers, printers, set-top boxes, recorders, storage devices, bridging/relaying devices, and playback devices.

12. The method of claim 1, wherein both converting steps are applicable for all standard priority levels of all conventional Internet service protocols.

13. The method of claim 1, wherein both converting steps use of a mapping table stored in a memory of the home gateway.

14. The method of claim 13, wherein the mapping table specifies mappings standard priority levels and corresponding harmonized priority levels.

15. The method of claim 13, further comprising:
updating the mapping table by the Internet service provider.

16. The method of claim 13, wherein the harmonized priority levels comprise four assured forwarding (AF) classes, and wherein with each AF class has three service levels based on drop probabilities.

17. The method of claim 1, further comprising:
converting a destination IP address and port number for the packet to corresponding protocol identification.

18. The method of claim 1, wherein the input priority level is indicated by a guaranteed slot for transmitting the input packet.

19. The method of claim 1, wherein the input priority level is indicated by an ANGEL IEEE 802.15.4 enhancement layer (AEL).

20. The method of claim 1, wherein the input priority level is indicated by a frame tailoring (FRT) strategy.

21. The method of claim 1, wherein the input priority level is indicated by a priority toning (PRT) strategy.

22. The method of claim 1, wherein the input priority level is indicated by a clear channel assessment (CCA).

23. The method of claim 1, wherein the home gateway is connected to a home network, and wherein the home network is designed according to an IEEE 802.15.4 standard.

24. The method of claim 23, wherein the home network operates as a smart grid.

25. The method of claim 23, wherein the priority levels are set by a GUI based interface, by running a program, or by allowing default priority level.

26. The method of claim 23, wherein the home network is connected to the home gateway via a non-IP to Internet Protocol bridge.

27. The method of claim 23, wherein the home network is connected to the home gateway via a non-IP to Ethernet bridge.

28. An apparatus for harmonizing packets of a multimedia stream, wherein each packet includes a standard priority level, and wherein the standard priority levels of the packets are specified by standard Internet service protocols, comprising:
a home gateway configured to convert the standard priority level in an input packet received by the home gateway to a harmonizes priority level, wherein the home gateway processes the input packet according to the harmonized priority level, and converts the harmonized priority level to the standard priority level in a corresponding output packet after the processing,
wherein the home gateway includes a protocol stack, wherein the protocol stack includes physical, data link (DL), Internet Protocol (IP), transport, and application layers, and wherein the converting to the standard priority level is performed by a lower harmonization layer between the DL and IP layers, and converting to the harmonized priority level is performed by an upper harmonization layer between the transport and application layers.

* * * * *